United States Patent [19]

Koezuka et al.

[11] Patent Number: 4,805,224
[45] Date of Patent: Feb. 14, 1989

[54] PATTERN MATCHING METHOD AND APPARATUS

[75] Inventors: Tetsuo Koezuka, Tokyo; Hiroyuki Tsukahara, Atsugi; Masato Nakashima, Yokohama, all of Japan

[73] Assignee: Fujitsu Limited, Kawasaki, Japan

[21] Appl. No.: 20,201

[22] Filed: Feb. 27, 1987

Related U.S. Application Data

[63] Continuation of Ser. No. 617,583, Jun. 5, 1984, abandoned.

[30] Foreign Application Priority Data

Jun. 8, 1983 [JP] Japan .................. 58-100962

[51] Int. Cl.$^4$ .............................................. G06K 9/62
[52] U.S. Cl. .......................................... 382/8; 382/14; 382/30; 382/34
[58] Field of Search ............... 358/101, 106, 107; 382/8, 14, 30, 34, 42, 48

[56] References Cited

U.S. PATENT DOCUMENTS

| | | | |
|---|---|---|---|
| 3,898,617 | 8/1975 | Kashioka et al. | 382/8 |
| 4,200,861 | 4/1980 | Hubach et al. | 382/48 |
| 4,435,835 | 3/1984 | Sakow et al. | 358/101 |
| 4,441,205 | 4/1984 | Beritin et al. | 382/8 |

OTHER PUBLICATIONS

Philips Technical Review, vol. 38, No. 11/12, 1978/1979, pp. 356-363; E. H. J. Persoon: "A System That Can Learn to Recognize Two-Dimensional Shapes".
European Search Report, The Hague, 03-25-88.
J. S. Boland et al., "Design of a Correlator for Real-Time Video Comparison", 1-79.

Primary Examiner—Leo H. Boudreau
Attorney, Agent, or Firm—Staas & Halsey

[57] ABSTRACT

Disclosed is a pattern matching method and apparatus, in which an object pattern is collated with a master pattern using pattern matching. As a first step, an area corresponding to a master pattern size is sequentially extracted from a master sample image for forming the master pattern, each extracted pattern is collated and the other patterns in the master sample image. An extracted pattern which has a minimum similarity to all the other patterns, and, as a result, shows the most distinctive pattern, is used for the master pattern. Using the present method and apparatus, pattern matching having a higher recognition rate can be performed. Further, using the present pattern matching method, an apparatus can be obtained for positioning the object to be recognized with a highest positioning accuracy.

9 Claims, 17 Drawing Sheets

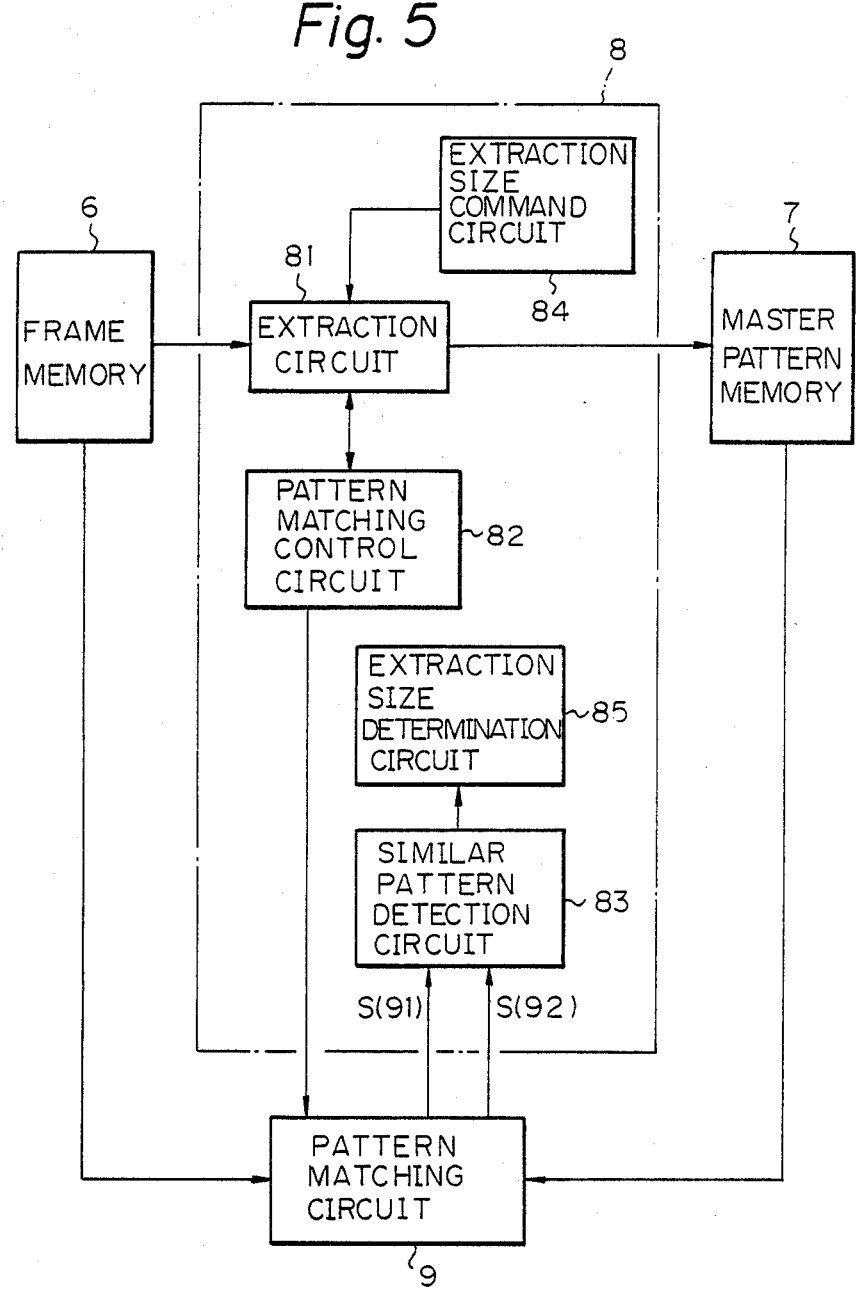

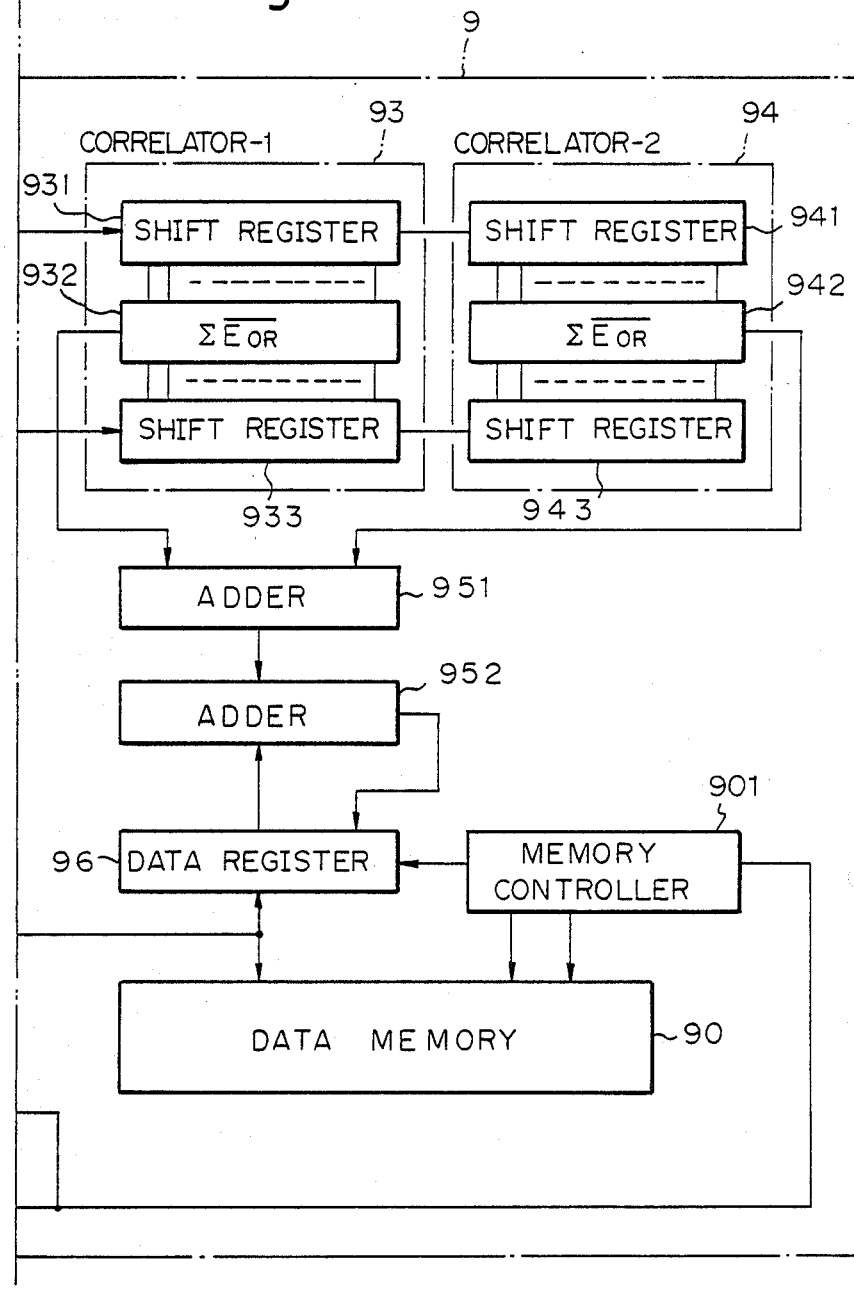

PATTERN MATCHING METHOD AND APPARATUS

This is a continuation of co-pending application Ser. No. 617,583 filed on June 5, 1985 now abandoned.

BACKGROUND OF THE INVENTION

(1) Field of the Invention

The present invention relates to a pattern recognition apparatus, more particularly to a pattern matching method and apparatus wherein the optimum master pattern can be selected quantitatively when the pattern matching method is performed.

(2) Description of the Prior Art

The inventors of the present application have already disclosed a Master Pattern Pick Up Method in Japanese unexamined patent publication (Kokai) No. 59-4130. This publication discloses a method of forming a master pattern using a pattern matching. In this method, only the appropriateness of the master pattern indicated by an operator is checked, and the best method of forming a master pattern is not always provided. That is, the master pattern indicated by the operator is checked only for whether it has similar patterns or not in the image picture. The most appropriate master pattern or the master pattern having the most distinctive features, which has a minimum similarity to the other patterns in the image, is not selected. Also, since this must be determined by the operator, there is little or no reduction of the work load on the operator.

SUMMARY OF THE INVENTION

An object of the present invention is to provide a pattern matching method and apparatus based on a concept of picking up a master sample that includes a master pattern and automatically detecting a pattern having the most distinctive features, wherein operation by the operator is not necessary as the most appropriate master pattern is automatically obtained. That is, the master pattern in the image picture having the most distinctive features i.e., having the minimum matching degree to the other patterns, is selected and memorized, and pattern recognition having a high recognition rate and highly accurate positioning through the use of pattern recognition is carried out using the master pattern.

According to an aspect of the present invention, there is provided a pattern matching method comprising the steps of, sequentially extracting a pattern with a predetermined size from an image in order to form a master pattern, mutually comparing each extracted pattern with all the other patterns in the image, registering the extracted pattern which has the minimum similarity to the other patterns, as a master pattern, and identifying the object pattern by a pattern matching procedure between the image including the object pattern and the master pattern.

According to another aspect of the present invention, there is provided a pattern matching apparatus having an image pickup system for picking up an image of a sample put on a sample feed mechanism; an analog to digital (A/D) converter circuit converts an analog pickup signal from the image pickup system to a digital signal. After conversion, an object pattern memory receives the output of the A/D converter circuit. Also included are a master pattern forming circuit, connected to the object pattern memory; a master pattern memory, connected to the master pattern forming circuit; and a pattern matching circuit connected to the object pattern memory and the master pattern memory; The master pattern forming circuit includes a distinctive pattern detection circuit for detecting the most distinctive pattern portion in the object pattern memory and for storing the detected pattern portion into the master pattern memory.

BRIEF DESCRIPTION OF THE DRAWINGS

FIG. 5 is a block circuit diagram of the master pattern forming circuit according to a second embodiment of the present invention;

FIGS. 16A and 16B are a block circuit diagram of a pattern matching circuit shown in FIG. 2.

DESCRIPTION OF THE PREFERRED EMBODIMENTS

Figure 1:
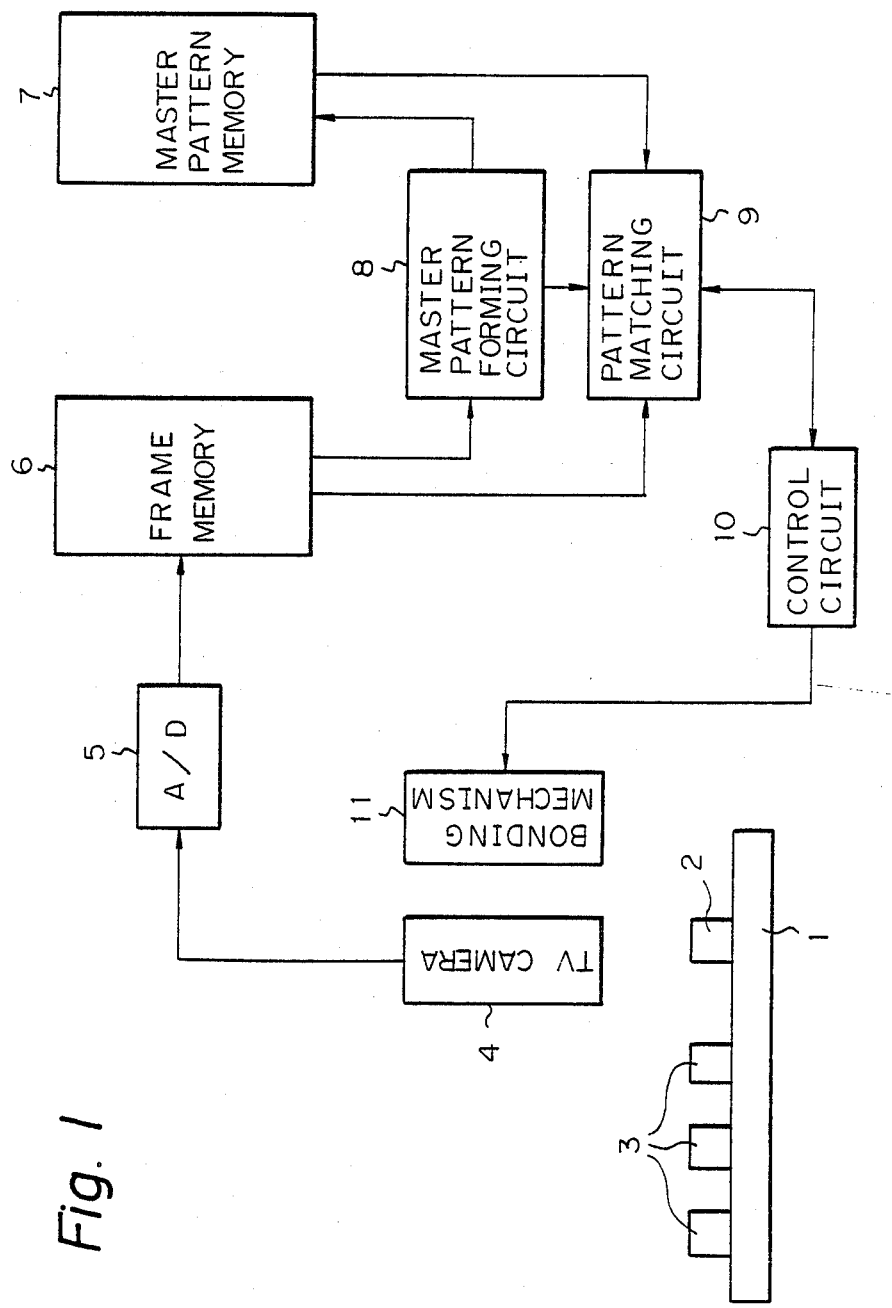
FIG. 1 is a block circuit diagram of a pad pattern position recognition apparatus for a fully automatic wire bonder using a pattern matching method and apparatus according to a first embodiment of the present invention.

FIG. 1 shows a block circuit diagram of a pad pattern position recognition apparatus for a fully automatic wire bonder using a pattern matching method and apparatus according to a first embodiment of the present invention. A sample feed mechanism 1 introduces a master sample 2 or an object sample 3 to be recognized placed thereon, into an image pickup system, for example a television (TV) camera 4. A pickup signal from the TV camera 4 is converted to a digital signal through an analog to digital (A/D) conversion circuit 5 and stored in a frame memory 6, which is an object pattern memory. When the object sample 3 is placed on the sample feed mechanism 1 and a master pattern has been stored in a master pattern memory 7, a pattern matching circuit 9 performs comparison (pattern matching) of the master pattern and the image of the object pattern in the frame memory 6 A pattern portion which is matched at the highest degree to the master pattern is sent by the pattern matching circuit 9 to a control circuit 10 as a desired pad position. The control circuit 10 controls a bonding mechanism 11 using the positioning information and automatic wire bonding is then carried out.

On the other hand, at the time the master pattern is formed, the most appropriate pattern portion is selected as a master pattern in a master pattern forming circuit 8 from a master sample image stored in the frame memory 6 and picked up from the master sample 2 placed on the sample feed mechanism 1, and the selected portion is stored into a master pattern memory 7.

Figure 2:
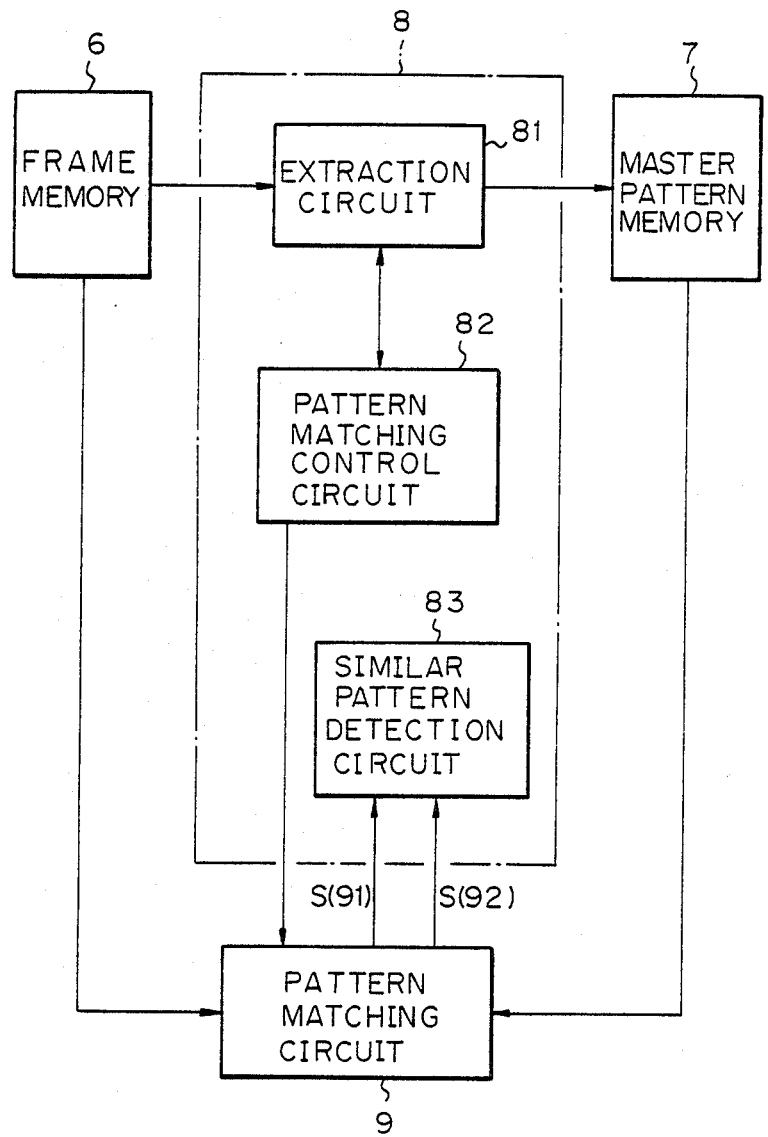
FIG. 2 is a block circuit diagram of a master pattern forming circuit in the apparatus shown in FIG. 1.
Figure 3:
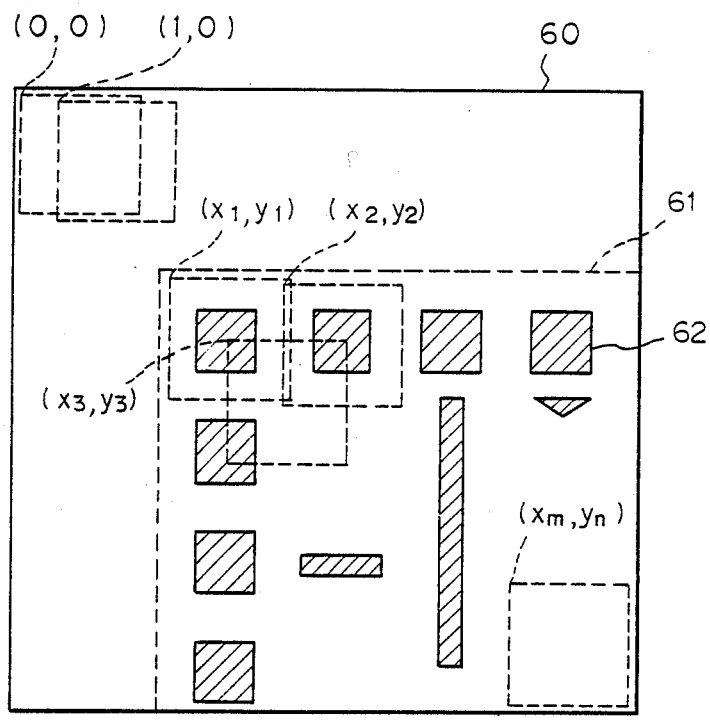
FIG. 3 shows an example of an image picture stored in a frame memory in the apparatus shown in FIG. 1.

The operation of the above-mentioned master pattern forming circuit 8 is explained with reference to FIGS. 2 and 3. FIG. 2 is a block circuit diagram of the master pattern forming circuit 8 and circuits connected thereto. When the master pattern is being formed, the master sample image is stored in the frame memory 6. FIG. 3 shows an image 60 stored in the frame memory 6. The images of pads 62 shown as hatching on a chip 61 of an integrated circuit (IC) are included in the image 60.

An extraction circuit 81 extracts a small area (0, 0) from the frame memory 6. A pattern in the small area is stored in the master pattern memory 7 as a temporary master pattern. A pattern matching control circuit 82 causes the pattern matching circuit 9 to perform patterns matching between the master pattern and all the patterns stored in the frame memory 6. The pattern matching circuit 9 scans the sample images in the frame memory 6, comparing them with the pattern in the master pattern memory 7. At each scanning point, the pattern matching degree signal S(92) between the master pattern and the corresponding pattern portions in the frame memory 6, and scanning position signal S(91), are sent to a similar pattern detection circuit 83. The similar pattern detection circuit 83 checks the sequentially transferred pattern matching degree signal S(92), and looks for the highest (first rank) pattern matching degree other than the extracting position (0, 0) of the extraction pattern. The first rank pattern matching degree is stored as a similar pattern matching degree $M_2$ (0, 0) to the extraction pattern (0, 0). In the above explanations, the reference symbol (0, 0) refers to coordinates at the upper left corner in the extraction pattern as shown in FIG. 2. The similar pattern detection circuit 83 includes a master pattern determination circuit.

Figure 4A:
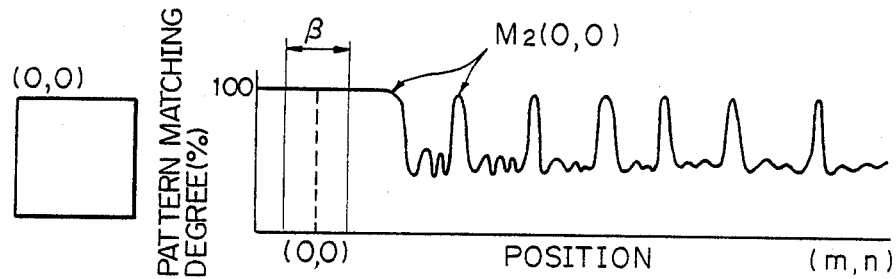
FIGS. 4A, 4B, and 4C are diagrams of the relationship between extraction areas shown in FIG. 3 and matching degrees.
Figure 4B:
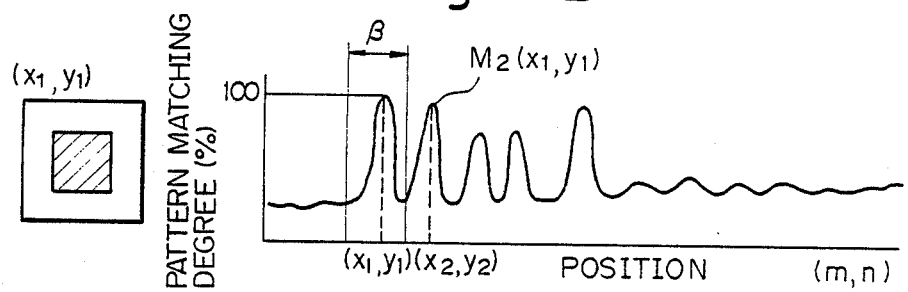
Figure 4C:
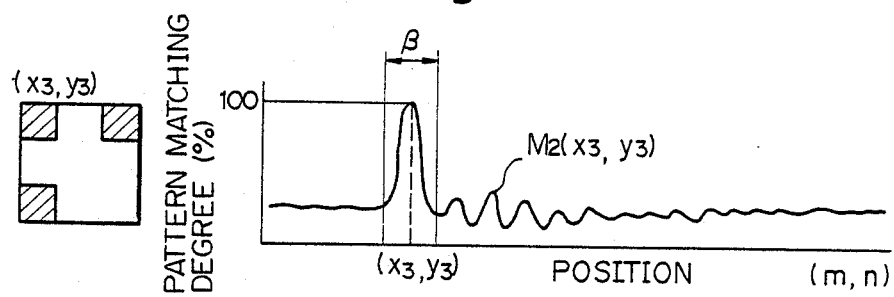

The extraction circuit 81 operates to store the next extraction pattern (1, 0) into the master pattern memory 7, looks for the first rank pattern matching degree, and obtains the similar pattern matching degree $M_2$ (1, 0). The above-mentioned extraction operation is performed to the end of the sample image, namely the coordinates $(x_m, y_n)$ in the frame memory 6. FIG. 4A shows a graph for the extraction pattern (0, 0). The abscissa of the graph is the scanning position signal S(91) transferred from the pattern matching circuit 9. The ordinate is the pattern matching degree signal S(92). In FIGS. 4A, 4B, and 4C, patterns at the left side show extraction patterns. In the case of FIG. 4A, since the extraction pattern (0, 0) does not include a pad pattern, when the scanning positions are positioned at the portions not including pad patterns, all pattern matching degrees are 100 percent. Thus, the similar pattern matching degree $M_2$ (0, 0) is 100 percent. In FIG. 4B, a similar graph is shown for the extraction pattern $(x_1, y_1)$ in FIG. 3. In the extraction area $(x_1, y_1)$, one pad pattern is included. In this case, the pattern matching degree at the scanning position $(x_1, y_1)$ is, of course, 100 percent, Also a pattern matching degree close to 100 percent is obtained at the position $(x_2, y_2)$. If pads are the identical in shape, the pattern matching degree is 100 percent and this value is simultaneously the similar pattern matching degree $M_2$ $(x_1, y_1)$. FIG. 4C shows a graph similar to FIGS. 4A and 4B but corresponding to the extraction pattern $(x_3, y_3)$. In this case, the pattern matching degree at the scanning position $(x_3, y_3)$ is 100 percent, as in FIG. 4B. However, the pattern matching value does not reach such a high degree except in the case of the scanning position $(x_3, y_3)$. Thus, the similar pattern matching degree $M_2$ $(x_3, y_3)$ is lower than that of the examples in FIGS. 4A and 4B. The extraction pattern $(x_3, y_3)$ is a considerably distinctive pattern in the image 60. In FIGS. 4A, 4B, and 4C, portions referred to as $\beta$ are the extraction patterns themselves. These portions are, of course, not involved in the detection of the similar pattern matching degree $M_2$. The extraction pattern having the minimum value $M_{2min}$ out of all similar pattern matching degrees $M_2$ corresponding to all extraction patterns, is the most distinctive pattern in the image 60. If the master pattern determination circuit in the similar pattern detection circuit 83 determines the extraction pattern having the $M_{2min}$ as a master pattern, the most reliable pattern matching process can be carried out.

As mentioned previously, in the prior art, the similar pattern matching degree $M_2$ of the extraction pattern which is determined to be most appropriate is checked by the operator. If $M_2 < \alpha$, the extraction pattern is allowed to be the master pattern. If $M_2 \geq \alpha$, the extraction pattern is not allowed to be the master pattern. Therefore, the master pattern formed by the prior art process does not always provide the most appropriate master pattern, i.e., that which has the lowest similarity degree which compared to the other patterns, as does the present embodiment. The value $\alpha$ is typically an allowable similarity degree of, for example, 80 percent.

As previously stated, in this embodiment, the formation of the master pattern, hitherto determined and indicated by the operator, is performed automatically and most appropriately and, as a result, a high performance pad pattern position recognition apparatus for a fully automatic wire bonder can be realized.

Figure 6:
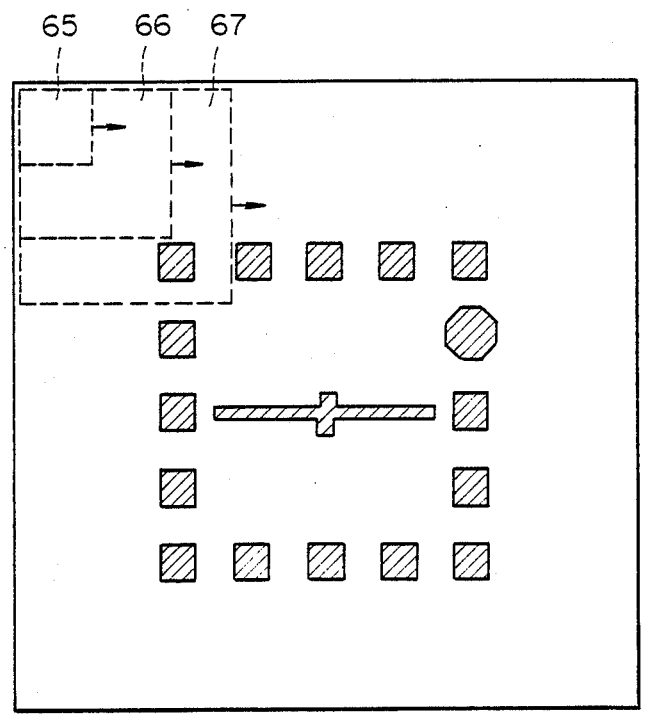
FIG. 6 shows an image picture of a master sample for explaining the circuit shown in FIG. 5.

A second embodiment according to the present invention is explained with reference to FIGS. 5 and 6. In the first embodiment, the size of an extraction area is predetermined, and the most distinctive pattern defined at that size is detected. FIG. 5 shows a block circuit diagram of the master pattern forming circuit 8 according to the second embodiment. The difference between the second embodiment and the circuit shown in FIG. 2 is the addition of an extraction size command circuit 84 and an extraction size determination circuit 85.

The extraction size command circuit 84 commands an initial extraction size (area 65 in FIG. 6) of the given master sample image, to the extraction circuit 81. The extraction circuit 81 sequentially extracts the area having the size 65 from the master sample image. As described in the first embodiment, the similar pattern matching degree $M_{2min}$ at size 65 is detected by the similar pattern detection circuit 83. The similar pattern matching degree $M_{2min}$ is transferred to the extraction size determination circuit 85.

Figure 7:
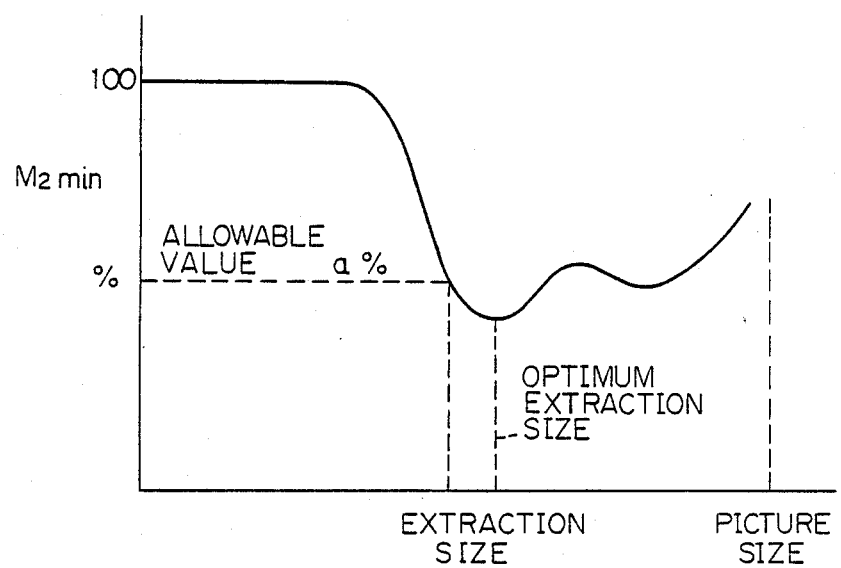
FIG. 7 is a graph showing an example of a relationship between each extraction pattern size and the similar pattern matching degree in the circuit shown in FIG. 5.

Then, changing the extraction size 65 to the next size 66, the extraction size command circuit 84 performs processes similar to the above-mentioned processes. When these operations are repeated, the similar pattern matching degrees $M_{2min}$ corresponding to each extraction size are obtained by the extraction size determination circuit 85, as shown in FIG. 7. After applying a plurality of extraction sizes, the extraction pattern having the minimum $M_{2min}$ is determined as a master pattern. Using this method, the extraction size which has the least pattern matching degree compared to the other patterns in the master sample image, namely, the most distinctive pattern, can be determined. If an allowable value "a" percent is predetermined for a master pattern similar pattern matching degree $M_{2min}$, when the extraction size is changed sequentially and the value of $M_{2min}$ becomes lower than "a" percent, the extraction size, at that moment, is determined as a master pattern size. As a result, the determination of the master pattern size can be speeded up.

Figure 8:
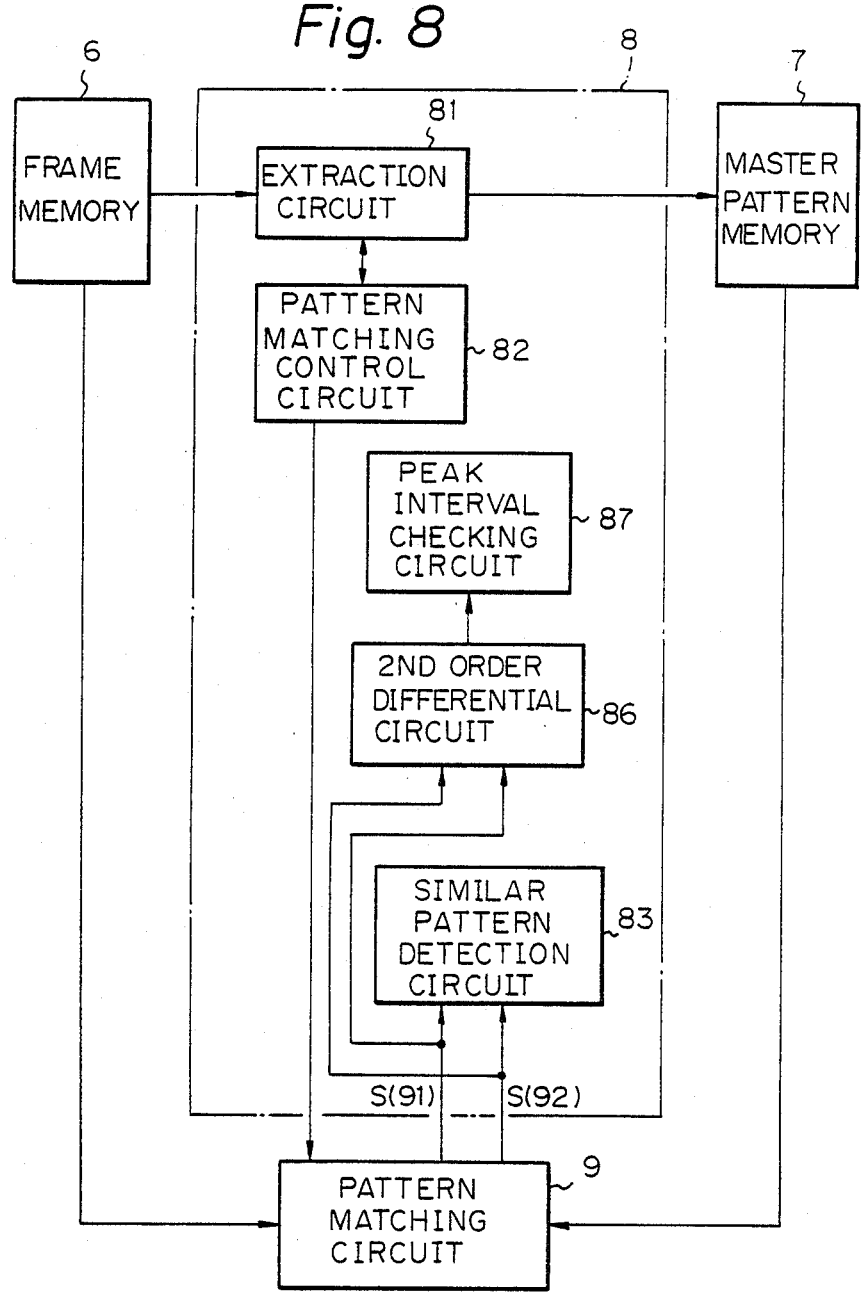
FIG. 8 is a block circuit diagram of a master pattern forming circuit according to a third embodiment of the present invention.

As stated above, in the second embodiment, there is an advantage wherein the master pattern size, which was determined as a certain size, can be determined with an optimum value, automatically. FIG. 8 shows a block circuit diagram of a master pattern forming circuit 8 according to a third embodiment of the present invention. The circuit 8 comprises the circuits in FIG. 2, plus a second order differential circuit 86 and a peak interval checking circuit 87. The principle of the operation in the third embodiment is now explained with reference to FIGS. 9 and 10.

Figure 9:
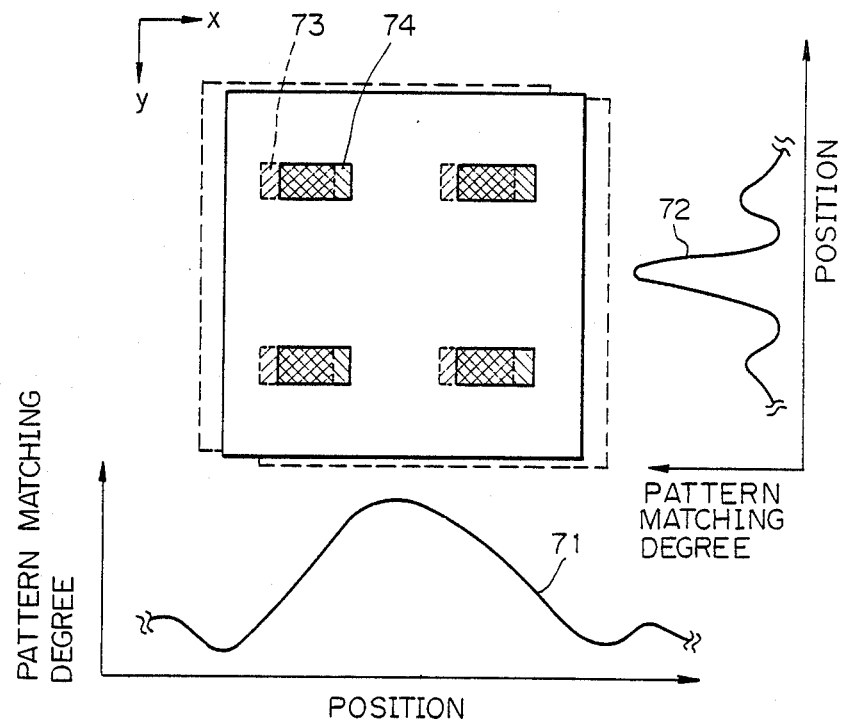
FIGS. 9, 10, and 11 are diagrams of a correlation between the position of the master pattern and the pattern matching degree for various shapes of an image pattern.
Figure 10:
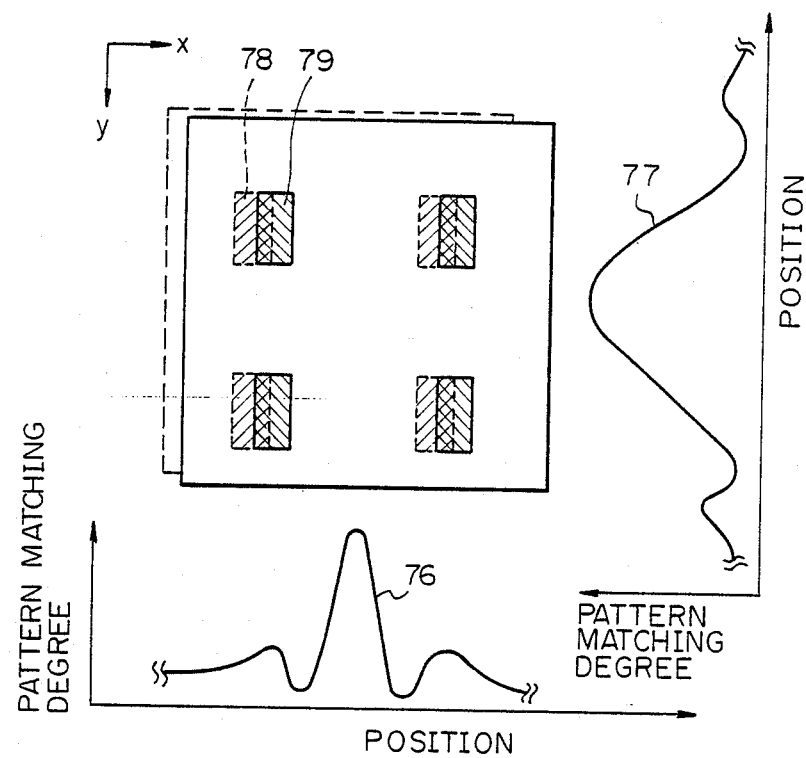

Curves 71 and 76 in FIGS. 9 and 10 show pattern matching degrees between the object patterns 73 or 78 and moving master patterns 74 or 79, respectively, (corresponding to the portions referred to as $\beta$ in the curves in FIG. 4A, 4B, and 4C). As found from the curves 71 and 76, where the object pattern and the master pattern include many longer figures in the lateral direction (FIG. 9), when the master pattern moves in the x direction, the curve showing the pattern matching degree has a gentle slope. On the other hand, as shown in FIG. 10, where the patterns include longer figures in the longitudinal direction, the curve is steep. In position recognition using pattern matching, the sharper the curve the higher the positioning accuracy. Namely, when the curve is a gentle slope, as in the curve 71 in FIG. 9, the accuracy of the positioning decreases because the peaks at the matching position are not well-defined.

Figure 11:
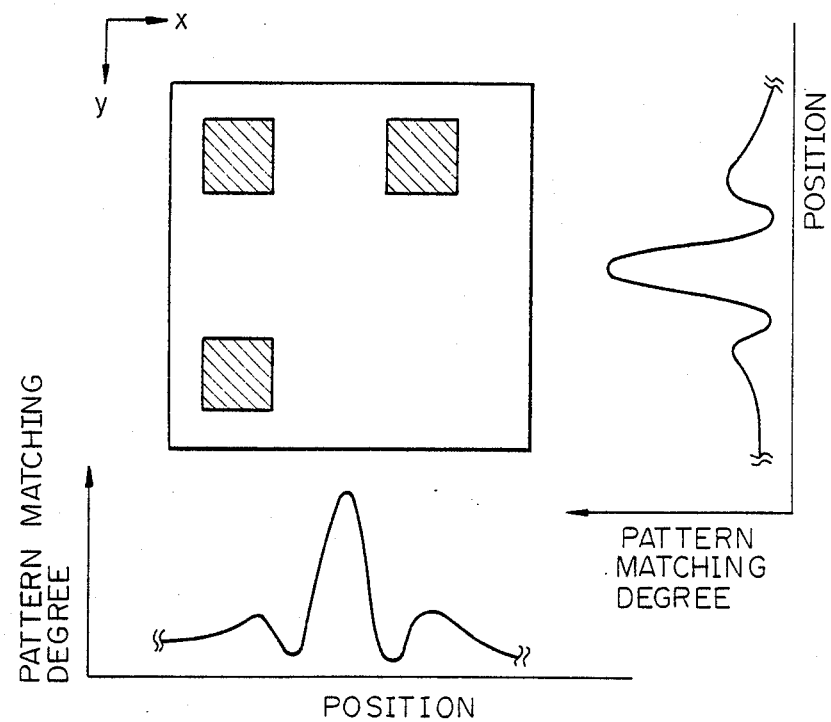

Curves 72 and 77 in FIGS. 9 and 10 show the pattern matching degree when the master pattern moves in the y direction. In this case, the curve 72 is sharp and the curve 77 is gentle. As mentioned above, in the pattern of FIG. 9 the positioning accuracy along the y direction is high, but the positioning accuracy along the x direction is low. In the pattern of FIG. 10, on the contrary, the positioning accuracy along the x direction is high and the positioning accuracy along the y direction is low. As a result, both the patterns in FIGS. 9 and 10 are not patterns appropriate for increasing the position accuracy. The pattern shown in FIG. 11, which has sharp curves in both the x and y directions, is the most appropriate pattern.

Figure 12A:
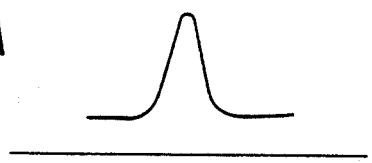
FIGS. 12A, 12B, and 12C, and FIGS. 13A, 13B, and 13C are graphs showing first order differential values and second order differential values of matching degree curves for explaining the circuit shown in FIG. 8.
Figure 12B:
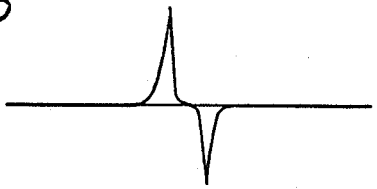
Figure 12C:
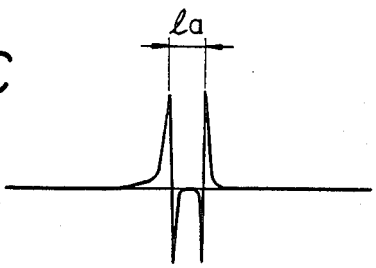
Figure 13A:
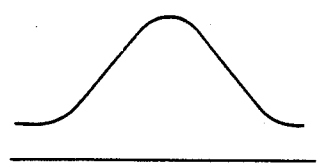
Figure 13B:
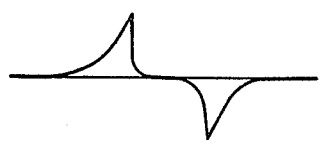
Figure 13C:
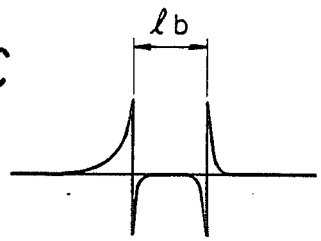

In the third embodiment, the pattern matching apparatus comprises the second order differential circuit 86 and the peak interval checking circuit 87, shown in FIG. 8, as means to check whether the master pattern is appropriate or not. The operations of the two circuits are explained with reference to FIGS. 12A, 12B, and 12C, and FIGS. 13A, 13B, and 13C. Curves shown in FIGS. 12A and 13A are the curves showing the pattern matching degrees similar to those in FIGS. 9 and 10. To check the sharpness of the curve, the second order differential circuit 86 forms second order differential curves, as shown in FIGS. 12C and 13C, from the curves in FIGS. 12A and 13A, respectively. The curves in FIGS. 12B and 13B are first order differential curves, as an intermediate step therebetween. The second order differential curves each have two peaks. The length of peak intervals la and lb corresponds to the sharpness of the original curves shown in FIGS. 12A and 13A. The intervals la and lb are checked by the peak interval checking circuit 87. If the intervals are shorter than a predetermined allowable length, the formed master pattern is determined as the most appropriate one. If the intervals are longer than the predetermined allowable length, instead of the initially selected master pattern, another master pattern, for example, having a pattern matching degree $M_2$ of the next lower rank (next higher degree), is accepted. As mentioned above, by using the apparatus of the third embodiment, a master pattern capable of a high accuracy positioning can be formed.

Figure 14:
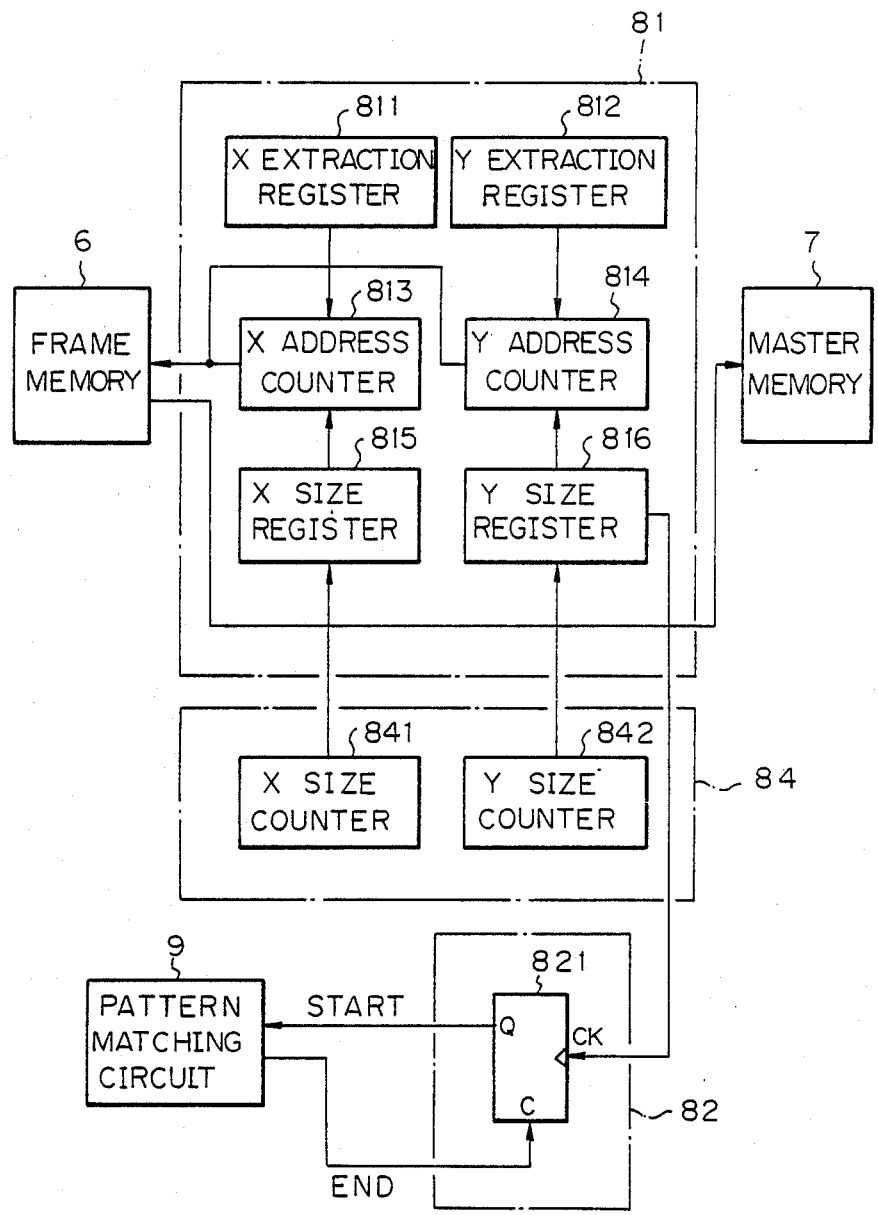
FIG. 14 is a block circuit diagram of an extraction circuit, an extraction size command circuit, and a pattern matching control circuit shown in FIG. 5.

The details of the extraction circuit 81, the extraction size command circuit 84, and the pattern matching control circuit 82 in the apparatus of the second embodiment are explained with refrence to FIG. 14. The circuits can be applied partially to the apparatus of the other embodiments. FIG. 14 shows the block circuit diagram of the extraction circuit 81, the extraction size command circuit 84, and the pattern matching control circuit 82. An X extraction register 811 for storing an initial x value in extraction, and a Y extraction register 812 for storing an initial y value in extraction, store coordinate values of the scanning start point (upper left point in FIG. 6), and supply information to an X address counter 813 and a Y address counter 814. The X address counter 813 and the Y address counter 814 point out an address of the frame memory 6. An X size register 815 and a Y size register 816 indicate extraction sizes along the directions X and Y to the address counters, respectively. The extraction size command circuit 84 comprises an X size counter 841 and a Y size counter 842. The X size counter 841 and the Y size counter 842 supply information for designating the extraction size to the X size register and the Y size register, respectively. The pattern matching control circuit 82 comprises a flip-flop 821. The flip-flop 821 receives the signal from the Y size register 816, is set by the signal, supplies a start signal to the pattern matching circuit 9, and is reset by an end signal from the pattern matching circuit 9.

Figure 15:
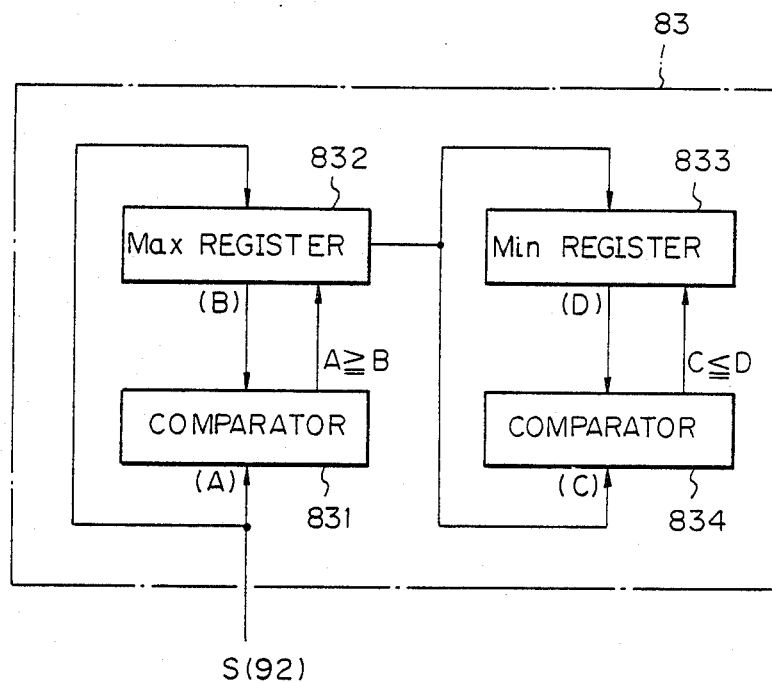
FIG. 15 is a block circuit diagram of a similar pattern detection circuit shown in FIG. 2.

FIG. 15 shows a block circuit diagram of the similar pattern detection circuit 83 used in the apparatuses of the first, second, and third embodiments. A pattern matching degree signal S(92) from the pattern matching circuit 9 is supplied to a comparator 831 and, simultaneously, to a Max register 832. The comparator 831 compares the value A of the signal S(92) with the value B of the Max register 832. If $A \leq B$, a latch signal is sent to the Max register 832 from the comparator 831, and the value A of the signal S(92) is stored in the Max register 832. The comparator 834 compares the maximum similarity degree (value C) of the Max register 832 with the value D of a Min register 833. If $C \leq D$, a latch signal is sent to the Min register 833 from the comparator 834, and the value C from the Max register 832 is stored in the Min register 833. The value of $M_{2min}$ previously mentioned is stored in the Min register 833.

Figure 16A:
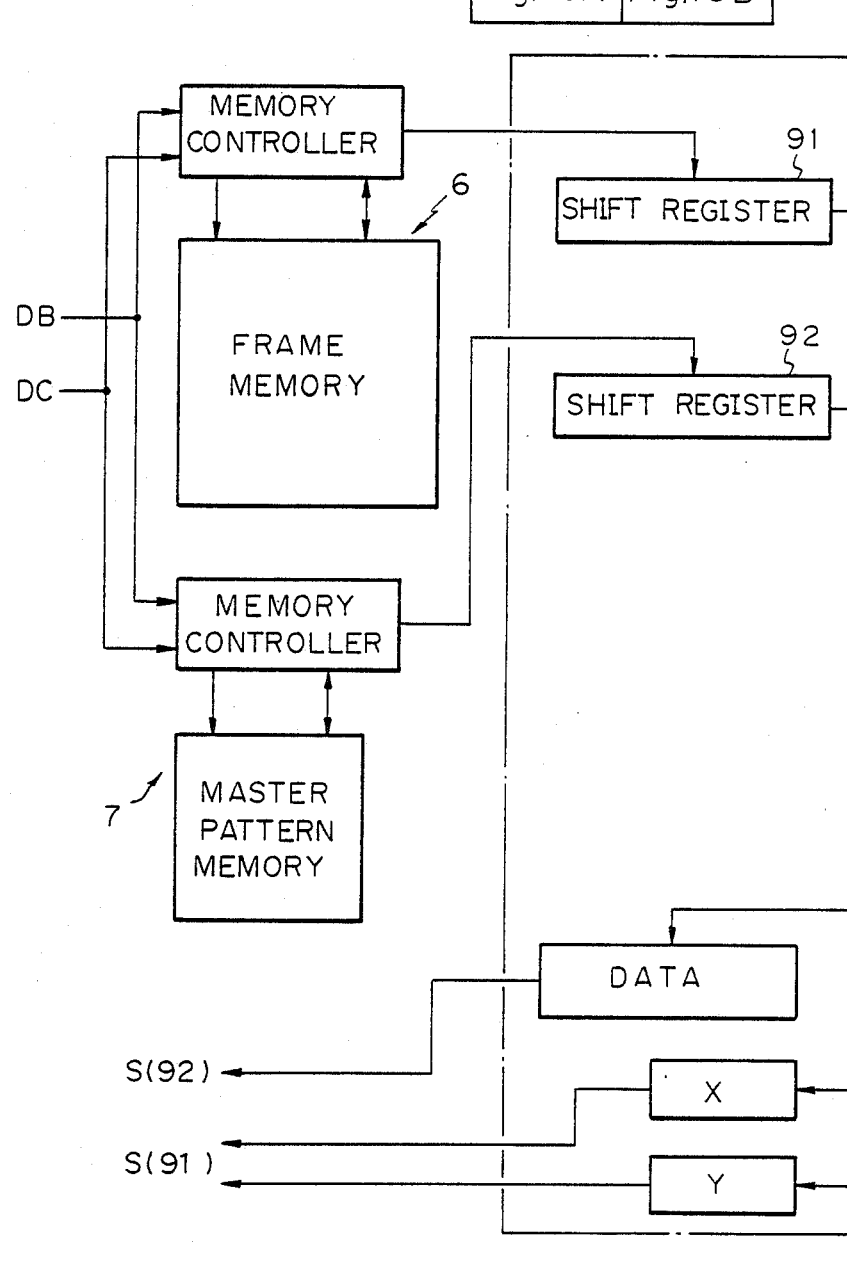

FIGS. 16A and 16B show a block circuit diagram of the pattern matching circuit 9 used in the apparatuses of the first, second, and third embodiments. The frame memory 6 is controlled by signals from a data buffer DB (not shown) and from a decoder DC (not shown) through a frame memory controller 161 for the frame memory 6. The frame memory 6 supplies data of the object pattern to a shift register 931 in a correlator 1 −193 and to a shift register 941 in a correlator 2 94 through a shift register 91, which converts the parallel signal to a series signal. Master pattern data from the master pattern memory 7 is supplied via a master pattern memory controller 16 to a shift register 933 in the correlator 93 and to a shift register 943 in the correlator 94 through a shift register 92, in a manner similar to that of the data of the object pattern. An inverting exclusive logical summation between the outputs of the shift registers 931 and 941 and the outputs of the shift registers 933 and 943 occur one by one through exclusive NOR gates 932 and 942. The output of the exclusive NOR gate 932 is added to the output of the exclusive NOR gate 942 through an adder 951. By these operations, the number of coincident pixels in the collation between the pattern in the frame memory 6 and the pattern in the master memory 7 can be obtained. When the result of the addition is obtained for one line, the result is stored in a data memory 90. The data in the data memory 90 is controlled by a memory controller 901, is applied to an adder 952 through a data register 96, and is added to the summation of the next one line collation, namely, the output of the adder 951. The added value increments the stored value of the data memory 90. As mentioned above, in the data memory 90, the pattern matching degree of one frame between the pattern in the frame memory 6 and the master pattern is obtained. The pattern matching degree is sent to the similar pattern detection circuit 83 in the form of the signal S(92). The scanning position signal S(91) is sent to the similar pattern detection circuit 83 from the memory controller 901.

We claim:

1. A pattern matching method, comprising the steps of:
   (a) sequentially extracting patterns from an image to produce extracted patterns each having an area with an extraction pattern size, comprising the substeps of:
      (ai) picking a master sample image for forming a master pattern; and
      (aii) sequentially extracting the extracted patterns with the extraction pattern size beginning with an initial pattern in the master sample image;
   (b) mutually comparing each of the extracted patterns with all other patterns in the image, comprising the substeps of:
      (bi) comparing each of the extracted patterns wtih all other patterns in the master sample image;
      (bii) calculating pattern matching degrees between each of the extracted patterns and all the other patterns in the master sample image;
      (biii) determining a similar matching degree of each of the extracted patterns, the similar matching degree being a maximum of the pattern matching degrees between each of the extracted patterns and all the other patterns;
      (biv) calculating a waveform of the pattern matching degrees;
      (bv) differentiating the waveform of the pattern matching degrees to form a second order differential waveform; and
      (bvi) measuring an interval length between peaks of the second order differential waveform;
   (c) registering one of the extracted patterns having the similar matching degree which is a minimum, as a master pattern, when the interval length is within a predetermined range; and
   (d) identifying an object pattern by a pattern matching procedure between the image including the object pattern and the master pattern.

2. A pattern matching apparatus, comprising:
   an image pickup system for picking up an analog image of a sample placed on a sample feed mechanism;
   an analog to digital converter circuit, operatively connected to said image pickup system, for converting the analog image from the image pickup system into a digital signal;
   an object pattern memory, operatively connected to said analog to digital converter circuit, for receiving the digital signal from the analog to digital converter circuit and for storing a master pattern image including pattern signals;
   a master pattern forming circuit, operatively connected to said object pattern memory, comprising distinctive pattern detection means for detecting and outputting from the object pattern memory extracted pattern portions, each having an area, the extracted pattern portions including a most distinctive pattern portion, said distinctive pattern detection means comprising:
   an extraction circuit, operatively connected to said object pattern memory, for sequentially extracting an extracted pattern signal with a master pattern size from said object pattern memory;
   a pattern matching control circuit, operatively connected to said extraction circuit, for outputting a signal controlling calculation of pattern matching degree between the extracted pattern signal and all other of the pattern signals in said object pattern memory;
   a similar pattern detection circuit for detecting a first rank similar pattern and a similar matching degree of extracted patterns, comprising a master pattern determination circuit for detecting the first rank similar pattern having the similar matching degree which is a minimum, and for detecting an extraction pattern corresponding to the first rank similar pattern, as a master pattern;
   second order differential means, operatively connected to said similar pattern detection circuit, for calculating a second order differential waveform from a waveform of the pattern matching degree which is calculated for a scanning position and the pattern matching degree corresponding thereto; and
   peak interval decision means, operatively connected to said second order differential means, for measuring a peak interval length of the second order differential waveform, for comparing the peak interval length with a predetermined value and for deciding based on the comparing;
   a master pattern memory, operatively connected to said extraction circuit, for initially storing one of the extracted pattern portions as a temporary master pattern and for finally storing the most distinctive pattern portion; and
   a pattern matching circuit, operatively connected to said object pattern memory, said pattern matching control circuit, said similar pattern detection circuit, said second order differential means and said master pattern memory, for scanning each of the extracted patterns output from said master pattern forming circuit.

3. A pattern matching apparatus as set forth in claim 2, wherein said master pattern forming circuit further comprises a circuit, operatively connected to said extraction circuit and said similar pattern detection circuit, for sequentially changing an extracting pattern size and for calculating the pattern matching degree for the extraction pattern having the extracting pattern size.

4. A pattern matching apparatus, comprising:
an image pickup system for picking up an analog image of a sample placed on a sample feed mechanism;
an analog to digital converter circuit, operatively connected to said image pickup system, for converting the analog image from the image pickup system into a digital signal;
an object pattern memory, operatively connected to said analog to digital converter circuit, for receiving the digital signal from the analog to digital converter circuit;
a master pattern forming circuit, operatively connected to said object pattern memory, comprising distinctive pattern detection means for detecting and outputting from the object pattern memory extracted pattern portions, each having an area, the extracted pattern portions including a most distinctive pattern portion, said distinctive pattern detection means comprising:
pattern matching degree means for generating a pattern matching degree waveform;
second order differential means, operatively connected to said pattern matching degree means, for calculating a second order differential of the pattern matching degree waveform; and
peak interval decision means, operatively connected to said second order differential means, for measuring a peak interval length of the second order differential of the pattern matching degree waveform and for comparing the peak interval length with a predetermined value to select the most distinctive pattern portion;
a master pattern memory, operatively connected to said master pattern forming circuit and said extraction circuit, for initially storing one of the extracted pattern portions as a temporary master pattern and for finally storing the most distinctive pattern portion; and
a pattern matching circuit, operatively connected to said object pattern memory, said pattern matching degree means, said second order differential means and said master pattern memory, for scanning each of the extracted patterns output from said mater pattern forming circuit.

5. A master pattern selection method for selecting a master pattern from a digital image of a master sample, comprising the steps of:
(a) extracting a first portion of the digital image, the first portion being an array of elements, the array having at least one dimension and the first portion having an extraction size;
(b) determining similarity between the first portion and a second portion of the digital image having the extraction size by comparing each element of the first portion with a corresponding element in the second portion, comprising the sub steps of:

(bi) calculating a waveform of pattern matching degree between the first and second portions of the digital image;
(bii) differentiating the waveform to form a second order differential waveform having peaks; and
(biii) measuring an interval length between the peaks of the second order differential waveform;
(c) repeating step (b) relacing the second portion with all other portions of the digital image having the extraction size to determine a maximum similarity degree for the first portion;
(d) repeating steps (a) through (c), replacing the first portion with each of the second and other portions of the digital image having the extraction size; and
(e) selecting a master pattern from among the first, second and other portions of the digital image having the extraction size based on the interval length being in a predetermined range and the maximum similarity degree being smaller than a predetermined value.

6. A pattern matching apparatus, comprising:
sample input means for inputting a sample image;
memory means, operatively connected to said sample image means, for storing the sample image and a master pattern; and
pattern matching means, operatively connected to said memory means, for extracting an extracted pattern, having an area with an extracted pattern size, from the sample image, for scanning the extracted pattern and other patterns in the sample image to compare the extracted and other patterns, for determining a maximum similarity degree for the extracted pattern and for selecting one of the patterns as the master pattern based on the maximum similarity degree, said pattern matching means comprising:
a pattern matching circuit, operatively connected to said memory means, for comparing the extracted pattern and the other patterns and for generating a waveform of similarity degree; and
master pattern forming means, operatively connected to said memory means and said pattern matching circuit, for forming a master pattern, said master pattern forming means comprising:
an extraction circuit, operatively connected to said memory means, for extracting the extracted pattern;
a pattern matching control circuit, operatively connected to said extraction circuit and said pattern matching circuit, for controlling the comparing in said pattern matching circuit;
a similar pattern detection circuit, operatively connected to said pattern matching circuit, for detecting the master pattern in dependence upon the maximum similarity degree;
a second order differential circuit, operatively connected to said pattern matching circuit and said similar pattern detection circuit, for calculating a second order differential waveform having peaks from the waveform of similarity degree; and
a peak interval checking circuit, operatively connected to said second order differential circuit, for measuring an interval length between the peaks of the second order differential waveform.

7. A pattern matching apparatus, comprising:
sample input means for inputting a sample image;
a frame memory for storing the sample image;

a frame memory controller, operatively connected to said frame memory and said sample input means, for controlling access to said frame memory;

a master pattern memory for storing a master pattern;

a master pattern memory controller, operatively connected to said master pattern memory and said frame memory controller, for accessing said master pattern memory; and pattern matching means, operatively connected to said memory means, for extracting an extracted pattern, having an area with an extracted pattern size, from the sample image, for scanning the extracted pattern and other patterns in the sample image to compare the extracted and other patterns, for determining a maximum similarity degree for the extracted pattern and for selecting one of the patterns as the master pattern based on the maximum similarity degree, said pattern matching means comprising:

a first shift register operatively connected to said frame memory controller;

a second shift register operatively connected to said master pattern memory controller;

a third shift register operatively connected to said first shift register;

a fourth shift register operatively connected to said second shift register;

a first exclusive NOR gate operatively connected to said third and fourth shift registers;

a fifth shift register operatively connected to said third shift register;

a sixth shift register operatively connected to said fourth shift register;

a second exclusive NOR gate operatively connected to said fifth and sixth shift registers a first adder operatively connected to said first and second exclusive NOR gates;

a second adder operatively connected to said first adder;

a data register operatively connected to said second adder;

a data memory operatively connected to said data register;

a data memory controller operatively connected to said data register and said data memory; and master pattern forming means, operatively connected to said memory means and said pattern matching circuit, for forming a master pattern, said master pattern forming means comprising:

an extraction circuit, operatively connected to said frame and master pattern memory controllers, for extracting the extracted pattern;

a pattern matching control circuit, operatively connected to said extraction circuit and said first through sixth shift registers, said first and second adders and said data memory controller, for controlling the comparing in said pattern matching; and a similar pattern detection circuit, operatively connected to said pattern matching circuit, for detecting the master pattern in dependence upon the maximum similarity degree.

8. A pattern matching method, comprising the steps of:

(a) picking up a master sample image from a master sample to form a master pattern;

(b) sequentially extracting patterns with an extraction pattern size from the master sample image to produce extracted patterns;

(c) scanning each of the extracted patterns;

(d) calculating pattern matching degrees between each of the extracted patterns and all remaining patterns in the master sample image in dependence upon said scanning in step (c);

(e) determining a similar matching degree for each of the extracted patterns, the similar matching degree being a maximum of the pattern matching degrees between each of the extracted patterns and all remaining patterns in the master sample image;

(f) registering one of the extracted patterns as the master pattern, the master pattern having the similar matching degree which is the smallest among all of the extracted patterns, only if the interval length corresponding to the one of the extracted patterns is shorter than a predetermined value;

(g) identifying an object pattern by a pattern matching procedure between the master pattern and an image containing the object pattern;

(h) sequentially storing the pattern matching degrees for corresponding scanning positions and obtaining a matching degree curve;

(i) calculating a second order differential of the matching degree curve; and (j) measuring an interval length between two peaks of the second order differential of the matching degree curve.

9. A pattern matching apparatus, comprising:

an image pick up system for picking up an analog image of a sample placed on a sample feed mechanism and for producing an analog pick up signal;

an analog to digital converter circuit, operatively connected to said image pick up system, for converting the analog pickup signal from the image pickup system into a digital pickup signal;

an object pattern memory, operatively connected to said analog to digital converter circuit, for storing the digital pickup signal output by the analog to digital converter circuit;

a master pattern forming circuit, operatively connected to said object pattern memory, comprising a distinctive pattern detection circuit for detecting a most distinctive pattern portion, said distinctive pattern detection circuit comprising:

an extraction circuit, operatively connected to said object pattern memory, for sequentially extracting a pattern signal with a master pattern size from said object pattern memory when said object pattern memory includes a master pattern image;

a pattern matching control circuit, operatively connected to said extraction circuit, for controlling calculation of a pattern matching degree between the pattern signal extracted by said extraction circuit and other pattern signals stored in said object pattern memory; and a similar pattern detection circuit, for detecting a first rank similar pattern and a similar matching degree of extracted patterns, said similar pattern detection circuit comprising a master pattern determination circuit for detecting the first rank similar pattern having the similar matching degree which is smallest among the pattern signals stored in said object pattern memory, and for determining an extraction pattern corresponding to the first rank similar pattern, as a master pattern;

a master pattern memory, operatively connected to said extraction circuit and said similar pattern detection circuit, for initially storing a temporary master pattern and for finally storing the most distinctive pattern portion;

a pattern matching circuit operatively connected to said object pattern memory, said pattern matching control circuit, said similar pattern detection circuit and said master pattern memory, for calculating the pattern matching degree under control of said pattern matching control circuit;

means for sequentially storing the pattern matching degree corresponding to each scanning position and for obtaining a matching degree curve;

second order differential means for calculating a second order differential of the matching degree curve;

peak interval checking means for measuring an interval length between two peaks of the second order differential of the matching degree curve; and limiting means for limiting a selection range of the master pattern in said master pattern determination circuit to extracted patterns having an interval length shorter than a predetermined value.

* * * * *

UNITED STATES PATENT AND TRADEMARK OFFICE
CERTIFICATE OF CORRECTION

PATENT NO. : 4,805,224
DATED : February 14, 1989
INVENTOR(S) : Tetsuo Koezuka, Hiroyuki Tsukahara, Masato Nakashima It is certified that error appears in the above-identified patent and that said Letters Patent is hereby corrected as shown below:

Column 2, line 68, after "6" insert a --.--.

Column 6, line 24, "refrence" should be --reference--.

Column 7, line 52, "wtih" should be --with--.

Column 9, line 55, "mater" should be --master--.

Signed and Sealed this

Seventeenth Day of October, 1989

Attest:

DONALD J. QUIGG

Attesting Officer

Commissioner of Patents and Trademarks